United States Patent
Klein Gunnewiek et al.

(10) Patent No.: US 6,963,609 B2
(45) Date of Patent: Nov. 8, 2005

(54) IMAGE DATA COMPRESSION

(75) Inventors: Reinier Bernardus Maria Klein Gunnewiek, Eindhoven (NL); Wilhelmus Hendrikus Alfonsus Bruls, Eindhoven (NL); Mathieu Holl, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 727 days.

(21) Appl. No.: 09/936,137
(22) PCT Filed: Jan. 5, 2001
(86) PCT No.: PCT/EP01/00109

§ 371 (c)(1),
(2), (4) Date: Sep. 7, 2001

(87) PCT Pub. No.: WO01/52550

PCT Pub. Date: Jul. 19, 2001

(65) Prior Publication Data

US 2003/0058940 A1 Mar. 27, 2003

(30) Foreign Application Priority Data

Jan. 12, 2000 (EP) .................................... 00200094
Mar. 10, 2000 (EP) .................................... 00200871
Jun. 15, 2000 (EP) .................................... 00202081

(51) Int. Cl.$^7$ .............................................. H04N 7/12
(52) U.S. Cl. ............................................. 375/240.03
(58) Field of Search ................... 375/240.01–240.07, 375/240.12–240.16, 240.2, 240.22, 240.26

(56) References Cited

U.S. PATENT DOCUMENTS

| 5,657,015 | A | * | 8/1997 | Nakajima et al. ............. 341/61 |
| 5,822,462 | A | * | 10/1998 | Miyake ...................... 382/251 |
| 6,160,846 | A | * | 12/2000 | Chiang et al. ......... 375/240.05 |
| 6,215,824 | B1 | * | 4/2001 | Assuncao ............. 375/240.26 |
| 6,396,955 | B1 | * | 5/2002 | Abe .......................... 382/232 |
| 6,477,706 | B1 | * | 11/2002 | Hua et al. ..................... 725/96 |
| 6,567,562 | B1 | * | 5/2003 | Nakayama et al. ......... 382/246 |
| 6,763,070 | B1 | * | 7/2004 | Lee .......................... 375/240.2 |

* cited by examiner

Primary Examiner—Chris Kelley
Assistant Examiner—Dave Czekaj

(57) ABSTRACT

A method and a device are provided, in which a signal is encoded to obtain a bit-stream. Blocks of quantized transform coefficients are provided. Transform coefficients corresponding to higher frequencies are attenuated more than coefficients corresponding to lower frequencies. For attenuating higher-frequency coefficients, the invention provides a curve (QC) with higher quantization step-size ($Q_{ADD}$) for transform coefficients ($C_i$) corresponding to higher frequencies. Because this additional quantization step size ($Q_{ADD}$) is put in the resulting bit-stream, the reconstruction is performed with an original quantization step-size, without taking the additional quantizing into account. Therefore, a reconstructed coefficient will have a lower value than an original coefficient ($C_i$). Bit rates can easily be regulated by shifting the curve (QC) to lower or higher frequencies and/or multiplying the curve (QC).

18 Claims, 4 Drawing Sheets

IMAGE DATA COMPRESSION

The invention relates to a method, a device and a transmitter, in which an image signal is encoded to obtain a bit-stream. The invention further relates to transcoding. The invention also relates to a receiver, a bit-stream and a storage medium.

EP-0 514 663 A2 discloses an apparatus and method for motion video encoding employing an adaptive quantizer. The MPEG video standard defines a layered architecture for compressing a video sequence. First, a sequence of video pictures is subdivided into disjoint Groups Of Pictures (GOPs). Each GOP is compressed independently of other GOP's to facilitate random access to any picture and also to limit the propagation of transmission errors. Every picture in a GOP is subdivided into Macro-Blocks (MBs). For a color picture, an MB is a collection of 16×16 luminance pixels and two 8×8 blocks of chrominance pixels. In MPEG, the two chrominance components are both sampled at half the horizontal and vertical resolution of the luminance. As such, an MB completely describes a 16×16 color segment of a picture. In an MB the 16×16 luminance pixels are further subdivided into four luminance blocks of 8×8 pixels. The still or motion picture data in the form of MBs, represented by either the actual pixel data (intra-mode) or only the error data (predictive), is inputted to a transformation. This transformation is a two-dimensional Discrete Cosine Transform (DCT) applied to each of the MBs. After applying the DCT, the resulting coefficients undergo a quantization step. The DCT transform coefficients are uniformly quantized with a matrix of quantization steps. MPEG specifies one of two reference matrices from which the quantization steps may be derived. The choice of which matrix is used, depends on the MB mode. Although the reference matrices can be defined by the encoder at the beginning of a video sequence, they remain fixed afterwards. MPEG allows dynamic changes to the matrix of quantization steps, however, by allowing a scaling factor for the reference matrices. This scaling factor can be changed for every MB. The adaptation of this scaling factor is performed on an MB to MB basis and varies based on the complexity of the image and the available rate control requirements.

An object of the invention is to provide further compression. To this end, the invention provides a method, a device, a transmitter, a transcoder, a receiver, a bit-stream and a storage medium as defined in the independent claims. Advantageous embodiments are defined in the dependent claims.

In a first embodiment of the invention, blocks of transform coefficients are provided and higher-frequency transform coefficients are attenuated more than lower-frequency transform coefficients of the given block. The invention is based on the insight that especially for obtaining low bit-rates, attenuating higher-frequency transform coefficients is more advantageous than increasing a step-size for all transform coefficients. Increasing the step-size causes accumulation of errors in predictively coded pictures, because each predictively coded picture is predicted from a previous picture. In this way, errors will accumulate over a GOP. A resulting coding artifact can be seen as "breathing" of the picture quality over a time interval of a GOP which is normally about half a second. The invention provides further compression by attenuation of higher-frequency coefficients. Lower-frequency coefficients are less or not attenuated. Preferably, some of the lower-frequency coefficients remain unaffected. The accumulation of errors is herewith reduced.

For attenuating higher-frequency coefficients, the invention provides a curve with higher quantization step for higher-frequency transform coefficients. Because no curve information is put in the resulting bit-stream, the reconstruction is performed by using an original quantization scaling factor only. The quantization according to the invention can be seen as additional quantization, which is not taken into account in a reconstruction. Therefore, a reconstructed coefficient will have a lower value than an original coefficient. It should be noted that this curve represents a quantization step as function of coefficient number (position in the block). The curve therefore may depend on the scanning order of the coefficients in the block. Further, the curve can be construed as a weighting matrix, where higher-order (higher-frequency) coefficients have a higher attenuation (higher quantization step) than the lower order (lower-frequency) coefficients.

The bit rate can easily be regulated by shifting the curve to lower or higher frequencies and/or multiplying the curve.

In advantageous embodiments, wherein high frequency transform coefficients in a plurality of blocks are attenuated, the blocks are adaptively attenuated depending on their content to prevent occurrence of artifacts. For example, chrominance blocks are less attenuated than luminance blocks, or blocks with high-energy content are less attenuated than other blocks. In another advantageous embodiment according to the invention, at least one selected high-frequency transform coefficient is not attenuated to provide reduction of artifacts. Such a selected high-frequency transform coefficient has e.g. a frequency higher than a given frequency threshold and an amplitude higher than a given amplitude threshold.

The aforementioned and other aspects of the invention will be apparent from and elucidated with reference to the embodiments described hereinafter.

The drawings only show those elements that are necessary to understand the invention.

Figures 1, 2:
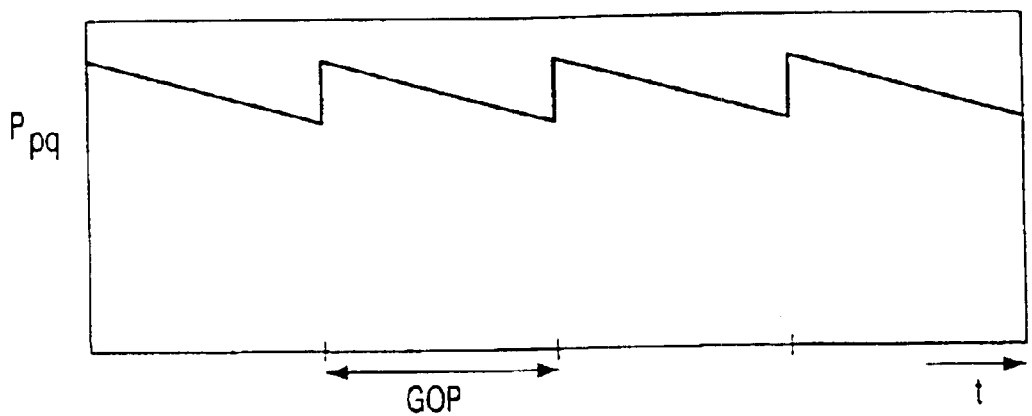
FIG. 1 shows a block of transform coefficients.
FIG. 2 shows an illustration of perceived picture quality as function of time when a higher step-size is used to encode an image signal.

FIG. 1 shows a block of transform coefficients. These coefficients $C_i$ are obtained by transforming a block of data from a spatial domain to a frequency domain. In this example, a picture is encoded per block of 8 by 8 pixels. The result of the transformation is a block of 8 by 8 transform coefficients (so i=0 . . . 63). From the left to the right in the block, the horizontal spatial frequency increases. From the top to the bottom, the vertical spatial frequency increases. The upper-left coefficient $C_0$ represents a DC coefficient. Although various transformations may be used, preferably DCT transformation is performed. In FIG. 1, a zigzag scanning is used to obtain an order of transform coefficients $C_i$. Although another scanning may be used, zigzag scanning is widely used, e.g. in MPEG.

In MPEG, coefficients $C_i$ are quantized by dividing them by a weight in a predefined quantization matrix and by a quantization scaling factor. The quantization scaling factor is adapted per macro block. The weights in the quantization matrix are so arranged that the less important coefficients are coded with less accuracy.

One way of reducing a bit rate would be to use a higher quantization scaling factor. Errors introduced by using a higher quantization scaling factor affect the picture quality. In a predictive coding method, like MPEG, errors in a given picture affect another picture when the given picture is used to predict the other picture. The degradation of intra-coded pictures is usually limited.

An error made in a picture that is used as a predictor is forwarded to a predicted picture. Accumulation of errors takes place, depending on the number of predictions that is made. The accumulation of errors gives rise to annoying effects. The perceived quality between a beginning and an end of a GOP differs significantly. This effect is illustrated in FIG. 2. A Perceived picture quality Ppq is shown as function of time t. This effect may be called "breathing", i.e. the Ppq decreases during a GOP and increases suddenly with a new, refreshing I picture.

Figure 3:
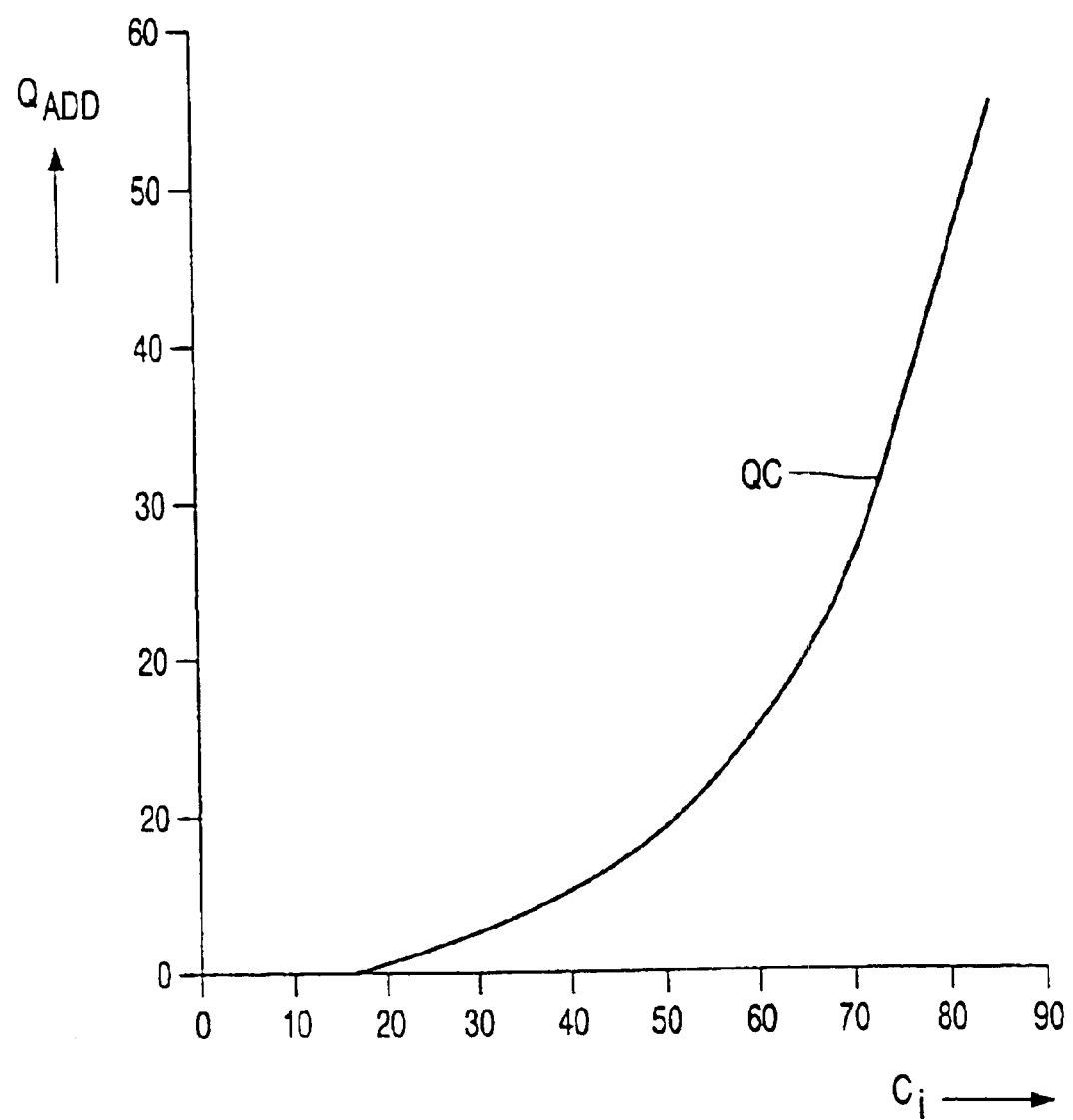
FIG. 3 shows a preferred quantization curve according to the invention.

Attenuating higher-frequency coefficients $C_i$ according to the invention reduces this accumulation of errors. In a preferred embodiment, the coefficients are quantized with an additional quantization step size $Q_{ADD}$. Because this additional quantization step is not put in the resulting bit-stream, the reconstruction is performed with the quantization scaling factor and the quantization matrix without taking into account the additional quantization. Therefore, a reconstructed coefficient will have a lower value than an original coefficient $C_i$. As a result, the coefficient $C_i$ has been attenuated. To reflect the lower importance of higher frequencies, the DCT coefficients are quantized with a variable quantization step depending on their position. FIG. 3 shows a curve QC showing the additional quantization step size $Q_{ADD}$ as a function of a position of the quantized transform coefficient $C_i$. In this embodiment the quantization step $Q_{ADD}$ gradually increases for higher-frequency transform coefficients $C_i$. The lowest coefficients $C_i$ are not affected, keeping their value from the incoming stream. This is done to protect the low frequencies to which the eye is very sensible. In a practical embodiment 8 coefficients always remain unaffected. Keeping the lower frequencies unaffected, is advantageous in preventing the accumulation of errors.

It would have been possible to remove every coefficient after a given position in the DCT coefficient order. However, due to a particularity of the DCT, that would have given rise to a deterioration of lower frequencies. In fact, the DCT is a kind of bank filter, which extracts a value for a range of frequencies, i.e. a DCT coefficient. The bank filter is however imperfect in that frequency ranges overlap each other. This means that a DCT coefficient contains energy in a quite large band. Therefore, quantizing a coefficient has some repercussions on lower frequencies. Thus, removing complete coefficients after a given position would not only remove the energy contained in high frequencies but also some energy contained in lower frequencies, because even a high frequency coefficient contains energy in lower frequencies. Attenuating is therefore better than removing transform coefficients $C_i$. A smoothly increasing step-size is advantageous regarding the removing of energy from lower frequencies. In a practical embodiment, a logarithmic function is used.

For bit rate control, the curve QC may be shifted. The curve QC is shifted to the left to reduce the bit rate and shifted to the right to increase the bit rate. Preferably, some lower frequency transform coefficients should not be additionally quantized. If lower frequencies remain untouched, less errors are accumulated.

For further bit rate control, the curve QC may be multiplied by a certain multiplier. In case the multiplier is larger than one, the coefficients are more coarsely quantized and the bit rate is further reduced. In case the multiplier is smaller than one, the coefficients are less coarsely quantized and the bit rate is increased. Shifting and multiplying may be performed in combination or independently.

Advantage may be taken from the prediction tree to avoid the propagation of errors. Instead of quantizing pictures heavily at a beginning of a prediction sequence, it is advantageous to quantize last pictures in a prediction sequence more heavily. In this way, predictions are made from rather good images. In a GOP with one I (intra-coded) picture followed by P (predictively coded) pictures, the P-pictures are in general quantized more heavily than the I-picture. Further a last P picture may be quantized even more heavily. Since about 25 pictures are displayed per second, one picture is displayed for only 0.04 second. During this very short lap of time, the human eye does not observe a drop in quality. Squeezing the last P picture is possible resulting in an extreme low number of bits used. The current P picture is of low quality, but this is no problem because the viewer does not notice the drop in quality and the last P picture is not used to predict another picture. This strategy can also be used for B (bi-directional predictively coded) pictures as they are also at an end of a prediction sequence. Generally, the B-pictures are quantized more heavily than the P-pictures but they cannot be quantized as coarsely as the last P-picture, since there are more than one B pictures in a GOP and repetitive drops in quality within a GOP tend to lower the global quality of the image as perceived. This strategy does not cause a breathing effect because errors that are forwarded to other pictures are smaller. Although it is possible to quantize more than one last P-picture more coarsely, this is less advantageous.

As discussed above, quantizing pictures more coarsely can be achieved by shifting or multiplying the quantization curve.

Figure 4:
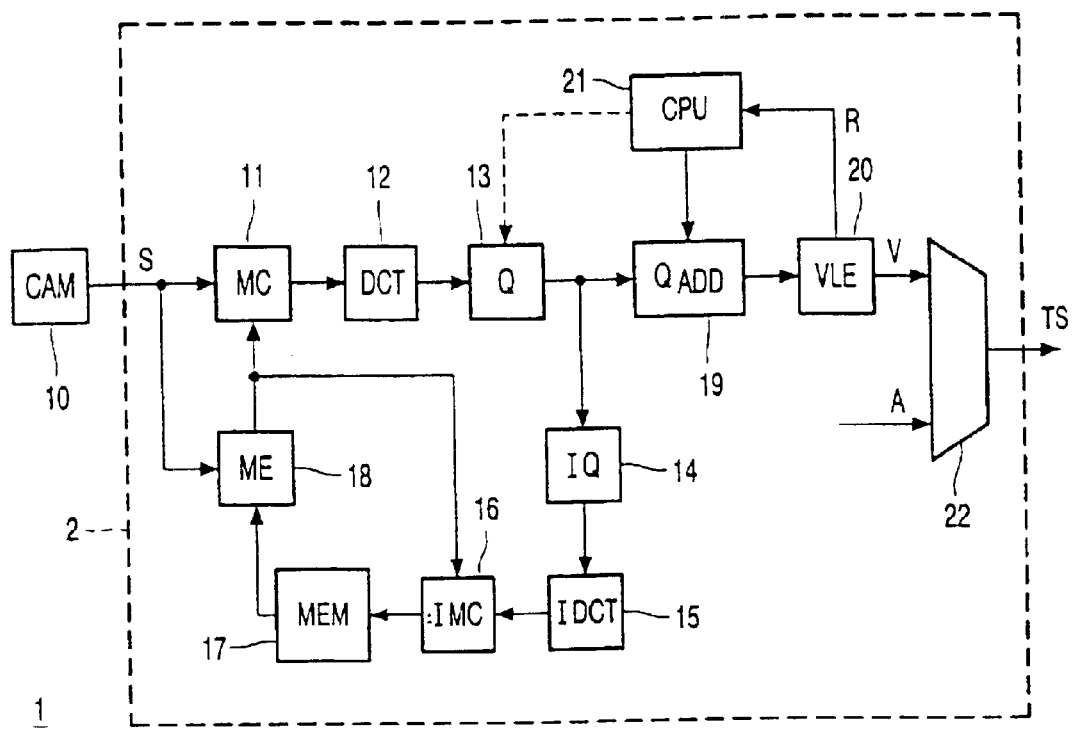
FIG. 4 shows an embodiment of a transmitter according to the invention.

FIG. 4 shows an embodiment of a transmitter according to the invention. The transmitter 1 comprises means for obtaining a signal S, e.g. a camera 10. The transmitter further comprises an encoding device 2. Although not necessary to the invention, the encoding device preferably encodes the image signal by using motion estimation and motion compensation. The device 2 therefore comprises a motion compensator MC 11 and a motion estimator ME 18. The motion compensator 11 furnishes a motion compensated difference signal to a transform coder 12. This transform coder 12 preferably applies a DCT transformation on the motion compensated signal. After the transformation, the transformed signal is quantized in quantizer Q 13. This is a standard quantization as is known from the prior art. To perform motion estimation, a reconstructed picture is necessary. Therefore, the device 2 comprises an inverse quantizer IQ 14 and an inverse transform coder IDCT 15 that perform inverse operations of Q 13 and DCT 12 respectively. In the inverse motion compensator IMC 16 that is coupled to the ME 18 the reconstructed picture is obtained. The reconstructed picture is stored in the picture memory MEM 17. The reconstructed picture is used for motion estimation in a next picture that has to be encoded. The quantized motion compensated signal as obtained in Q 13 is furnished to an additional quantizer $Q_{ADD}$ 19 according to the invention. The $Q_{ADD}$ 19 applies an additional quantization to the signal with a curve as shown in FIG. 3. The signal is thereafter encoded in the Variable Length Encoder VLE 20 to obtain a video elementary stream V. A bit rate R of the video stream V is derived in VLE 20 and furnished to CPU 21. The CPU 21 is coupled to $Q_{ADD}$ 19 to control the bit rate by shifting and/or multiplying the curve. The CPU 21 also controls other parts of the device 2. $Q_{ADD}$ may be defined for blocks of 8×8 pixels. The quantization scale factor used in Q 13 is defined per macroblock.

The $Q_{ADD}$ is preferably located outside the encoding loop MC 11 . . . ME 18. This means that e.g. for motion compensation, a better quality is available than from the additionally quantized signal. This is important, because a good quality of the reconstructed picture means that better encoding can be obtained, in the case of motion compensation due to a better motion estimation. The better motion estimation is performed, the better is the compression of the signal S. The video stream V is multiplexed with other streams, e.g. an audio elementary stream A in a multiplexer 22 to obtain a transport/program stream TS.

Coding bit-streams from an original bit-rate R1 to a new bit-rate R2 is called bit-rate transcoding. Bit-rate transcoding is e.g. performed to unify incoming bit-streams that vary in bit-rate. Further, the bit rates used for broadcasting are usually too high for storage on digital storage media, given the condition that enough playing time should be available. Therefore, bit rate reduction is often necessary. Furthermore, for implementation of long-play mode a low bit rate is required. The invention is preferably applied in a bit rate transcoder. Such a bit rate transcoder may be included in a digital video recorder. A common practice for bit rate transcoding is cascading a decoder and an encoder. A common decoder may be cascaded with an encoder according to the invention, which encoder attenuates high-frequency transform coefficients of DCT blocks, e.g. the encoder 2 from FIG. 4.

Figure 5:
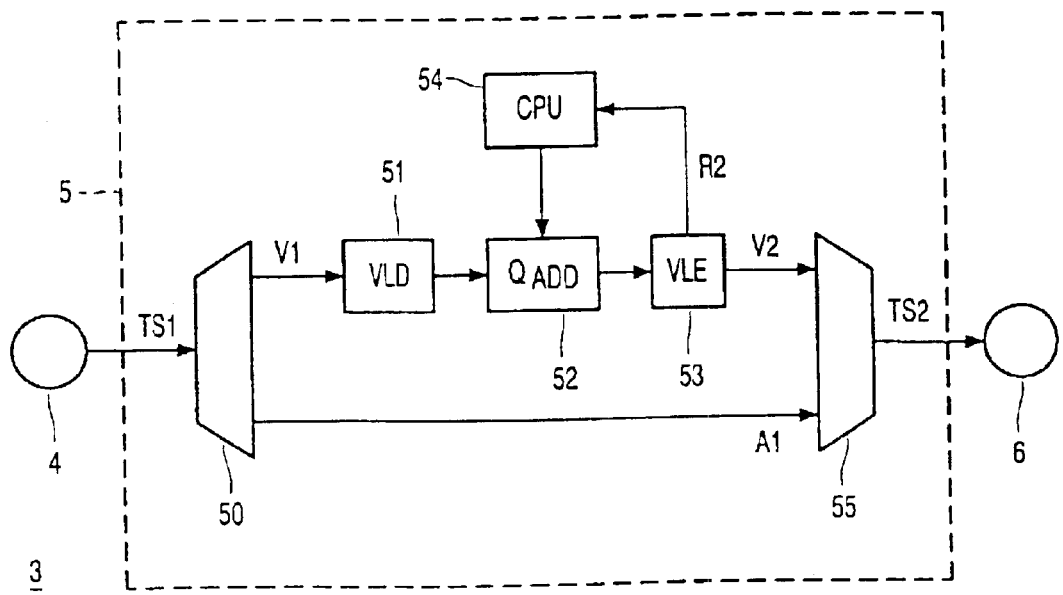
FIG. 5 shows an embodiment of a receiver according to the invention comprising a bit rate transcoder.

FIG. 5 shows an embodiment of a receiver (e.g. digital video recorder like D-VHS). The receiver 3 comprises receiving means 4 and a preferred bit rate transcoder 5. An incoming transport/program stream TS1 is received in receiving means 4, e.g. an antenna system, and thereafter de-multiplexed in a de-multiplexer 50 to obtain a video elementary stream V1 and an audio elementary stream A1. The transport stream TS1 may be transmitted by an embodiment as shown in FIG. 4. The video elementary stream V1 is passed to a Variable Length Decoder (VLD) 51 to obtain blocks of transform coefficients $C_i$. The audio elementary stream A1 is bypassed because transcoding an audio elementary stream will hardly affect the bit rate. After the VLD 51, the decoded video stream is finished to a quantizer $Q_{ADD}$ 52 according to the invention. In $Q_{ADD}$ 52, the higher frequency coefficients are attenuated as explained above. The additional quantized video stream is finished to a Variable Length Encoder (VLE) 53 to obtain a new video elementary stream V2. As in FIG. 4, a bit rate R2 is derived in the VLE 53 and furnished to a CPU 54 to control the $Q_{ADD}$ 52. The new video stream V2 is multiplexed together with the parsed audio stream A1 in a multiplexer 55 to obtain a new transport stream TS2. The new transport stream TS2 has a lower bit rate than the incoming transport stream TS1. The new transport stream TS2 may be stored on a storage medium 6. The storage medium 6 may be a DVD, a CD-ROM, a (D-VHS) tape, etc.

Figure 6:
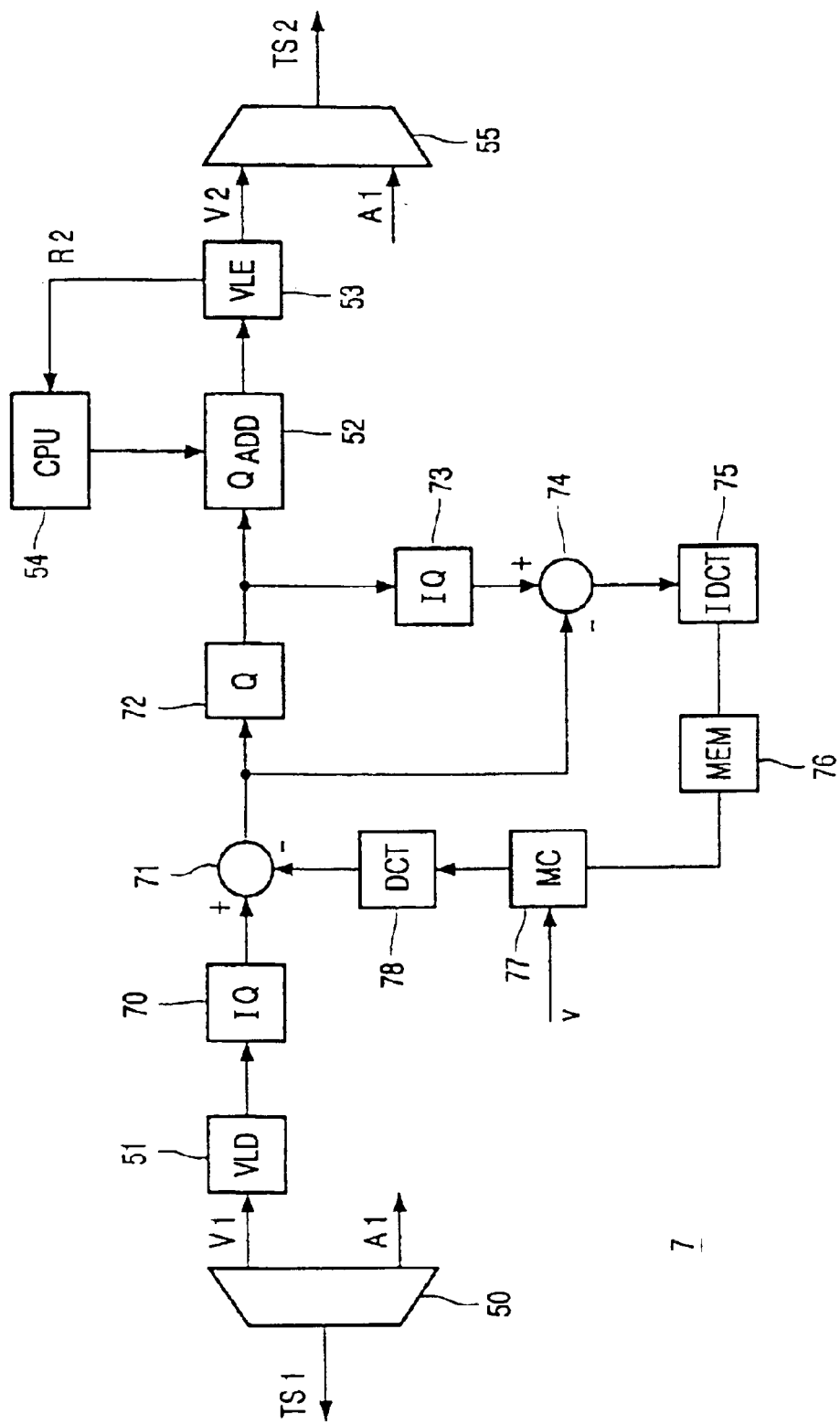
FIG. 6 shows a further bit rate transcoder that may be included in the receiver of FIG. 5.

FIG. 6 shows a further preferred bit rate transcoder 7, which may replace the transcoder 5 in the receiver of FIG. 5. The transcoder 7 is derived from a full decoder-encoder cascading and is based on a simplification of the encoder part. In a full decoder-encoder, the encoder computes motion vectors. These motion vectors are only used to construct a bit-stream in the encoder. It is likely that the motion vectors found by the motion estimation in the encoder of the full decoder-encoder are not different from the motion vectors v in an original bit-stream. Or, at least, new motion vectors refer to macro-blocks, which values are close to the values of macro-blocks referred to by the original vectors. Therefore, it is a great improvement from a complexity point of view to reuse the original motion vectors in the transcoder. In the transcoder 7, quantized transform coefficients are de-quantized in an inverse quantizer 70 to obtain de-quantized transform coefficients. The de-quantized transform coefficients are re-quantized in a quantizer 72. In FIG. 6, a feedback loop is illustrated for compensating a re-quantization error, which is due to a new, higher quantization step size in the quantizer 72. This extra quantization introduces extra coding errors. In order to prevent leakage of these errors, these errors are compensated. As these errors affect images which are predicted from the current image, motion compensation is applied to these errors in motion compensator 77 with use of the original motion vectors v. The motion compensated errors are subtracted from a next anchor frame in subtractor 71. Therefore, the reconstructed image will not be affected by the error made in the previous image. This avoids error accumulation. The feedback loop further comprises an inverse quantizer 73, a subtractor 74 and an inverse DCT unit 75 to obtain the re-quantization error. A memory 76 stores the re-quantization error. The motion compensated error is transform coded in a DCT unit 78 to furnish a transform coded motion compensated re-quantization error to the de-quantized signal. In case the motion compensator 77 is suitable for performing DCT domain motion compensation, the IDCT unit 75 and the DCT unit 78 may be omitted. Although FIG. 6 shows that $Q_{ADD}$ 52 is placed outside the error compensation loop 73–78, it will be clear to a person skilled in the art that the $Q_{ADD}$ 52 may also be placed inside this loop, if desired, e.g. for better error compensation the $Q_{ADD}$ 52 can be placed inside the error compensation loop 73–78 by e.g. coupling the output of $Q_{ADD}$ 52 to the input of IQ 73 rather than coupling the input of $Q_{ADD}$ 52 to the input of IQ 73.

The complexity of the bit rate transcoder according to FIG. 6 is lower than the full decoder-encoder. Nevertheless, the complexity is higher than the bit rate transcoder 5 of FIG. 5.

Due to the extreme low complexity of the proposed algorithm by the present invention, it is well suited for applications, especially for transcoding, which demand high throughput, like High Definition bit-streams. HD bit-streams can be re-quantized to a lower bit-rate, while the resolution remains the same. A preferred application of the invention reduces the bit-rate of an HD-stream for storing the lower bit-rate HD-stream on a storage medium. Another preferred application is a long play mode in Standard Definition (SD).

For some blocks, artifacts caused by attenuating high-frequency coefficients are more likely than for other blocks. Thus if blocks out of a plurality of blocks (e.g. a group of blocks, or one or more pictures) are each similarly attenuated, some annoying artifacts may occur for some blocks, which artifacts may accumulate. In a further embodiment of the invention, the artifacts are minimized by adapting the attenuation curve for certain blocks, depending on their block contents. Blocks that may cause some artifacts are less severely attenuated (or even not attenuated) than blocks that cause less or no trouble. Because in general only blocks with certain special properties cause artifacts, the amount of blocks that should be less severely attenuated is low. Therefore, the less severe compression only has a minor influence on the total compression. Examples of blocks that are advantageously less attenuated than other blocks are given below.

First, blocks of chrominance coefficients are attenuated less severe than blocks of luminance coefficients. This especially prevents artifacts when moving objects are present that have different color, but similar luminance. Because in most encoders, motion estimation/compensation is performed on the luminance only, moving objects with similar luminance are badly detected. The information on these moving objects is then mainly present in the chrominance blocks. Therefore, it is important keep most of the chrominance information. Further, because color information amounts for a small quantity compared to luminance information, no or only faint attenuation has only a minor effect on the overall compression. To obtain a simple embodiment, a fixed amount of attenuation (e.g. zero) may be chosen for the chrominance samples.

Further, blocks with a high energy content, e.g. blocks with large amplitudes for higher frequencies, may be attenuated less severely than blocks with a lower energy content. A high energy content often indicates a poor motion estimation/compensation, resulting in a high energy residue. It is important not to largely affect these high-energy residues, in order to provide accumulation of errors.

In another embodiment of the invention, in which artifacts are further reduced, selected coefficients are not subjected to the attenuation, but transmitted unaffectedly, while other coefficients are subjected to the attenuation curve. The selected coefficients include coefficients that have both a frequency above a certain frequency threshold and an amplitude above a certain amplitude threshold. The amplitude threshold may be the same for all frequencies, but may also depend on the frequency.

In general, if high frequencies are found with high amplitudes, e.g. above a certain threshold, the attenuation curve may be shifted or multiplied (with a factor <1) to lessen the strength of the attenuation, and/or certain coefficients may be selected to be unaffected by the attenuation.

It should be noted that the above-mentioned embodiments illustrate rather than limit the invention, and that those skilled in the art will be able to design many alternative embodiments without departing from the scope of the appended claims. The word 'picture' also refers to frame, field, etc. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

In summary, a method and a device are provided, wherein a signal is encoded to obtain a bit-stream. Blocks of quantized transform coefficients are provided. Transform coefficients corresponding to higher frequencies are attenuated more than coefficients corresponding to lower frequencies. For attenuating higher-frequency coefficients, the invention provides a curve QC with higher quantization step-size $Q_{ADD}$ for transform coefficients $C_i$ corresponding to higher frequencies. Because no information on this additional quantization step size $Q_{ADD}$ is put in the resulting bit-stream, a reconstruction is performed with an original quantization step step-size, without taking the additional quantization step into account. Therefore, a reconstructed coefficient will have a lower value than an original coefficient $C_i$.

Bit rates can easily be regulated by shifting the curve QC to lower or higher frequencies and/or multiplying the curve QC.

What is claimed is:

1. A method of encoding (2) a signal (S) to obtain a bit-stream (V,TS), the method comprising the steps of:
    providing (12,13) blocks of quantized transform coefficients ($C_i$); and
    attenuating (19) higher-frequency transform coefficients ($C_i$) of a given block more than lower-frequency transform coefficients of the given block, said attenuating comprises the step of:
    quantizing (19) the transform coefficients ($C_i$) of the given block with a curve (QC) having higher qantization steps ($Q_{ADD}$) for higher-frequency transform coefficients ($C_i$), without putting information concerning said curve (QC) into the bit-stream (V,TS).

2. A method as claimed in claim 1, further comprising the step of:
    shifting (19,21) the curve (QC) to adjust a bit rate (R) of the bit-stream (V,TS).

3. A method as claimed in claim 1, further comprising the step of:
    multiplying (19,21) the curve (QC) to adjust a bit rate (R) of the bit-stream (V,TS).

4. A method as claimed in claim 1, wherein the signal (S) comprises intra-coded and predictively coded pictures, the method comprising the step of:
    quantizing (19,21) predictively coded pictures at an end of a prediction sequence more coarsely than predictively coded pictures at a start of the prediction sequence.

5. A method as claimed in claim 1, the method further comprising the steps of:
    decoding (14,15) the blocks of quantized transform coefficients ($C_i$) to obtain a reconstructed picture rather than decoding (14,15) the attenuated (19) high-frequency transform coefficients ($C_i$).

6. A method as claimed in claim 1, the method further comprising:
    attenuating (19) high frequency transform coefficients ($C_i$) in a plurality of blocks, wherein the blocks are adaptively attenuated depending on their content.

7. A method as claimed in claim 6, wherein chrominance blocks are less attenuated (19) than luminance blocks.

8. A method as claimed in claim 6, wherein blocks with an energy content higher than other blocks are less attenuated (19) than the other blocks.

9. A method as claimed in claim 1, wherein at least one selected high-frequency transform coefficient ($C_i$) is not attenuated (19).

10. A method as claimed in claim 9, wherein the at least one selected high-frequency transform coefficient ($C_i$) has a frequency higher than a given frequency threshold and an amplitude higher than a given amplitude threshold.

11. A device (2) for encoding a signal (S) to obtain a bit-stream (V,TS), comprising:
    means (12,13) for providing blocks of quantized transform coefficients ($C_i$); and
    means (19) for attenuating high-frequency transform coefficients ($C_i$) of a given block by guantizing (19) the transform coefficients ($C_i$) of the given block with a curve (QC) having higher qantization steps ($Q_{ADD}$) for higher-frequency transform coefficients ($C_i$), without putting information concerning said curve (QC) into the bit-stream (V,TS).

12. A transmitter (1) comprising:

means (10) for obtaining a signal (S); and a device (2) for encoding the signal (S) comprising:

means (12,13) for providing blocks of quantized transform coefficients ($C_i$); and means (19) for attenuating high-frequency transform coefficients ($C_i$) of a given block by quantizing (19) the transform coefficients ($C_i$) of the given block with a curve (QC) having higher quantization steps ($Q_{ADD}$) for higher-freguency transform coefficients ($C_i$), without putting information concerning said curve (QC) into the bit-stream (V,TS).

13. A method of transcoding (5) an encoded signal (TS1, V1), comprising the steps of:

decoding (50,51) the encoded signal (TS1,V1) to obtain blocks of quantized transform coefficients ($C_i$); and attenuating (52) high-frequency transform coefficients ($C_i$) of a given block by quantizing (19) the transform coefficients ($C_i$) of the given block with a curve (QC) having higher quantization steps ($Q_{ADD}$) for higher-frequency transform coefficients ($C_i$), without putting information concerning said curve (QC) into the bit-stream (V,TS).

14. A bit rate transcoder (5) for transcoding an encoded signal (TS1,V1) comprising:

means (50,51) for decoding the encoded signal (TS1,V1) to obtain blocks of quantized transform coefficients ($C_i$); and means for attenuating (52) high-frequency transform coefficients ($C_i$) of a given block by quantizing (19) the transform coefficients ($C_i$) of the given block with a curve (QC) having higher quantization steps ($Q_{ADD}$) for higher-frequency transform coefficients ($C_i$), without putting information concerning said curve (QC) into the bit-stream (V,TS).

15. A bit rate transcoder (7) as claimed in claim 14, the bit rate transcoder (7) further comprising:

means (70,72) for re-quantizing the quantized transform coefficients to obtain re-quantized coefficients; and a feedback loop (73–78,71) for compensating a re-quantization error;

the means for attenuating (52) being arranged to attenuate high-frequency coefficients in blocks of the re-quantized coefficients.

16. A receiver (3) comprising:

means (4,50) for obtaining an encoded signal (TS1,V1); and a bit rate transcoder (5) for transcoding the encoded signal (TS1,V1) comprising:

means (50,51) for decoding the encoded signal (TS1,V1) to obtain blocks of quantized transform coefficients ($C_i$); and means for attenuating (52) high-frequency transform coefficients ($C_i$) of a given block by quantizing (19) the transform coefficients ($C_i$) of the given block with a curve (QC) having higher quantization steps ($Q_{ADD}$) for higher-frequency transform coefficients ($C_i$), without putting information concerning said curve (QC) into the bit-stream (V,TS).

17. A bit-stream (V,TS,V2,TS2) comprising blocks of quantized transform coefficients ($C_i$), wherein high-frequency transform coefficients ($C_i$) of a given block have been attenuated by quantizing (19) the transform coefficients ($C_i$) of the given block with a curve (QC) having higher quantization steps ($Q_{ADD}$) for higher-frequency transform coefficients ($C_i$), without putting information concerning said curve (QC) into the bit-stream (V,TS).

18. A storage medium (6) on which a bit-stream (V,TS, V2,TS2) as claimed in claim 17 is stored.

* * * * *